United States Patent
Longardner et al.

(10) Patent No.: US 6,909,349 B1
(45) Date of Patent: Jun. 21, 2005

(54) APPARATUS AND METHOD FOR COOLING POWER TRANSFORMERS

(75) Inventors: Robert L. Longardner, Indianapolis, IN (US); Anthony M. Visnesky, Jr., Springfield, IL (US)

(73) Assignee: Trexco, LLC, Indianapolis, IN (US)

(*) Notice: Subject to any disclaimer, the term of this patent is extended or adjusted under 35 U.S.C. 154(b) by 530 days.

(21) Appl. No.: 10/069,312

(22) PCT Filed: Nov. 17, 2000

(86) PCT No.: PCT/US00/31810

§ 371 (c)(1),
(2), (4) Date: Feb. 15, 2002

(87) PCT Pub. No.: WO01/37292

PCT Pub. Date: May 25, 2001

Related U.S. Application Data

(60) Provisional application No. 60/166,065, filed on Nov. 17, 1999.

(51) Int. Cl.⁷ .............................................. H01F 27/08
(52) U.S. Cl. ............................ 336/60; 336/55; 336/57; 336/58; 29/890.03; 29/602.1
(58) Field of Search ............................... 336/60, 55, 57, 336/58, 61; 29/890.03, 809.035, 602.1

(56) References Cited

U.S. PATENT DOCUMENTS

| | | | |
|---|---|---|---|
| 3,579,162 A | * | 5/1971 | Savkar ......................... 336/57 |
| 4,456,899 A | | 6/1984 | Matthes et al. |
| 4,936,109 A | * | 6/1990 | Longardner ................ 62/238.3 |

OTHER PUBLICATIONS

International Preliminary Examination Report (IPER) for PCT/US00/31810, established Mar. 14, 2002.
IP Australia: Examiner's First Report on Australian Patent Application No. 19224/01, mailed Dec. 18, 2003.
The Patent Office of the State Intellectual Property Office of the P. R. of China: First Office Action on Patent Application No. 00815793.6, issued Jan. 2, 2004.

* cited by examiner

*Primary Examiner*—Lincoln Donovan
*Assistant Examiner*—Jennifer A. Poker
(74) *Attorney, Agent, or Firm*—Daspin & Aument, LLP; Jefferson Perkins

(57) ABSTRACT

A system (27) for reducing the temperature of cooling oil for a power transformer (12) includes a heat exchanger (44) interposed in the cooling oil system. The heat exchanger (44) relies upon a liquid-to-liquid exchange of heat from the heated oil to a coolant flowing through the heat exchanger. In one embodiment, the coolant provided to the heat exchanger is obtained from an absorption chiller (65). Heat energy is provided to the chiller (65) from a heat storage device (80). In a specific embodiment, the heat storage source (80) can be a phase change material device. In a preferred cooling system, a programmable controller (55) determines the activation and operation of the system. The controller (55) can sense transformer or cooling oil temperature to trigger activation. In a preferred embodiment, the controller (55) compares a current temperature history against a temperature profile to anticipate increased cooling requirements. In certain embodiment, excess, off-peak or waste heat from the transformer (12) itself is provided to the heat storage device (80) or to the phase change heat exchanger.

26 Claims, 7 Drawing Sheets

APPARATUS AND METHOD FOR COOLING POWER TRANSFORMERS

This application claims the benefit of Provisional application Ser. No. 60/166,065 filed Nov. 17, 1999.

BACKGROUND OF THE INVENTION

The present invention pertains to transformers, and, in particular, to an apparatus and method for cooling power transformers during use.

Power transformers are employed within power supply systems in order to transform, transmit and distribute electricity for end-user consumption. Transformers are designated by high and low side operating voltages, and sized as to capacity of the volts and amperes being carried. For example, large-size transformers are utilized as transmission transformers, which step up the voltage along the power supply chain, as well as distribution transformers, which step down the voltages for distribution.

One shortcoming of existing transformers is their susceptibility to operational problems associated with high temperatures of operation, both internal and external to the transformers. Typically, in order to maintain rated capability and preserve useful life of the transformer and all of its constituent parts, maximum temperature within the transformer should be maintained below the lesser of 95° C. (203° F.) and a temperature that is 65° C. above ambient temperature. The failure to keep the transformer temperature so regulated can result in failure of the transformer or perhaps the significant reduction of its useful life, each of which results in high cost to the industry due to the need to replace the destroyed transformer units.

Moreover, due to the directly proportional relationship between temperature and electrical resistance, when the temperature of the copper windings in the transformer core increases, the efficiency of the transformer decreases, thereby resulting in a loss of power output (watts) proportional to transformer core heating. Moreover, during use, the temperature inside the transformer tends to increase due to the electrical current flowing through the conducting windings and the micro-current flowing in the magnetic steel core.

Some prior attempts at controlling transformer temperature have been relatively crude. For instance, one common approach has been to simply drench the transformer with a water spray when ambient conditions suggest the risk of excessive transformer temperature, or when a high temperature condition is sensed.

In another approach, oil baths have been provided for the inner workings of the transformer. In different prior art applications, such oil baths were designed to operate on several levels. First, a "self cooled" level essentially relies on convention currents within the transformers insulating and cooling oil to draw heat away from the core. A second level uses a forced circulation of the insulating oil through heat exchangers/radiators integral with or separate from the transformer which utilize ambient air around the heat exchangers to absorb the heat energy of the cooling oil. A third level uses the forced oil circulation of the second level but adds electric fans, powered by energy supplied from the transformer itself or other sources of power in the substation, to force air circulation over the external radiators thus increasing heat removal from the oil and therefore the transformer windings, and thereby increasing transformer efficiency. These fans, which are selectively operated when transformer temperature rises are sufficiently large, are controlled by a controller connected to temperature sensors located in and on the transformers.

A prior art system that uses fans is diagrammatically shown in FIG. 1. The transformer, generally designated 10, is of conventional design and includes a casing or housing in which is disposed a soft iron core 12 with copper windings 14 there-around. The core and windings are immersed in a bath of cooling oil 15. A nitrogen gas blanket 16 at the top of the internal volume of the transformer housing maintains the quality of the oil within the housing.

Positioned proximate the top of the transformer housing is an outlet connected via a top isolating valve 18 to a conduit 20 that leads to a radiator or heat exchanger, generally designated 22. In this prior system, radiator 22 includes finned cooling tubes 24 through which the cooling oil is circulated. The tubes are oriented in a series of spaced apart rows and columns to allow the passage of ambient air there-around for cooling purposes. A plurality of motor-driven fans 26 are designed to draw air over and around the finned cooling tubes 24 in order to provide forced-air ambient cooling. The outlet of radiator 22 is plumbed to a sealed, motor-driven pump 28 that pumps the cooling oil through conduit 30, bottom isolating valve 32, and back into the internal volume of the transformer housing.

During operation, pump 28 forces cooling oil into the base of the transformer as indicated by arrow 33. As the oil travels upward, as indicated at 35, over and through the various openings provided within the internal workings of the transformer (such as the core 12 and windings 14), the temperature of the cooling oil increases as it draws off heat, and thereby cools the transformer parts which have increased in temperature due to their operation. The now heated oil passes through the oil outlet at 37 into conduit 20 and is routed through radiator 22. Ambient air, which is ducked into the area in which the radiator is installed, is drawn over the cooling tubes 24 by fans 26 to cool the oil passing through tubes 24. The ambient air which has been heated as the energy is drawn off the cooling oil is discharged to the atmosphere, and the cooled fluid is returned to pump 28 for recirculation through the transformer.

While the prior art cooling system shown in FIG. 1 does provide some benefit, its cooling limitations result in some transformers being operated in conditions which are undesirable. Specifically, limits imposed by ambient conditions, most specifically temperature humidity, can result in the cooling oil passing entirely through the heat exchanger without a sufficient removal of heat energy, such that over time the temperature of the cooling continues to build, and the cooling capabilities of such oil then declines. In the end, the cooling oil may become too hot to prevent the transformer from exceeding recommended temperatures.

Also, transformer utilization and consequently load current loading typically occurs during the highest ambient temperature conditions. For example, the temperature of the oil bath may be elevated on days when the ambient conditions are extremely warm and humid, and consequently the oil is not adequately cooled and the temperature continues to build in the transformer until damage can be done to the transformer workings.

Thus, it would be desirable to provide a cooling system for power transformers which overcomes these and other shortcomings of the prior art.

SUMMARY OF THE INVENTION

The present invention provides an apparatus and method for improved cooling of the inner workings of a power transformer. The apparatus modulates transformer core heat while at the same time providing a high efficiency source of cooling which is less susceptible to having heat build up in the cooling oil due to ambient condition variation and core heat due to transformer loading. The apparatus selectively routes cooling oil for the transformer into a heat exchanger provided with a source of chillate more effective than ambient air. The present invention may utilize off-peak energy provided by the transformer to power the system via the use of heat exchangers that store energy for subsequent use. In one embodiment, the heat exchangers can utilize phase change material for heat storage.

One advantage of the present invention is that it provides a system for effectively cooling the inner workings of a transformer for all atmospheric conditions in order for the transformer to not be subjected to heat which damages its structural integrity and/or its efficiency.

Still another advantage of the present invention is that the cooling system can use a heat exchanger operated with chillate provided by the use of off-peak energy, thereby decreasing the cost of operations. Yet another advantage is that the heat energy of the transformer can be utilized in providing the energy required to operate the heat exchanger that cools the cooling oil routed in the transformer.

A further advantage is accomplished by features of the present invention that effect properly cooling of the transformer cooling oil for any ambient conditions, thereby maximizing the electrical capacity of the transformer.

One object of the inventive system is to improve the overall efficiency of the transformer by removing heat generated by current flow through the transformer. Another object is to increase the utilization and extend the useful life of the transformer serviced by the inventive cooling system.

The above mentioned and other advantages and objects of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 4A is cross-sectional view, taken along line 4A—4A of FIG. 4, of the phase change material heat exchanger, and further showing in dashed lines the electrical connection between the heat exchanger heating elements and a source of power.

Figure 1:
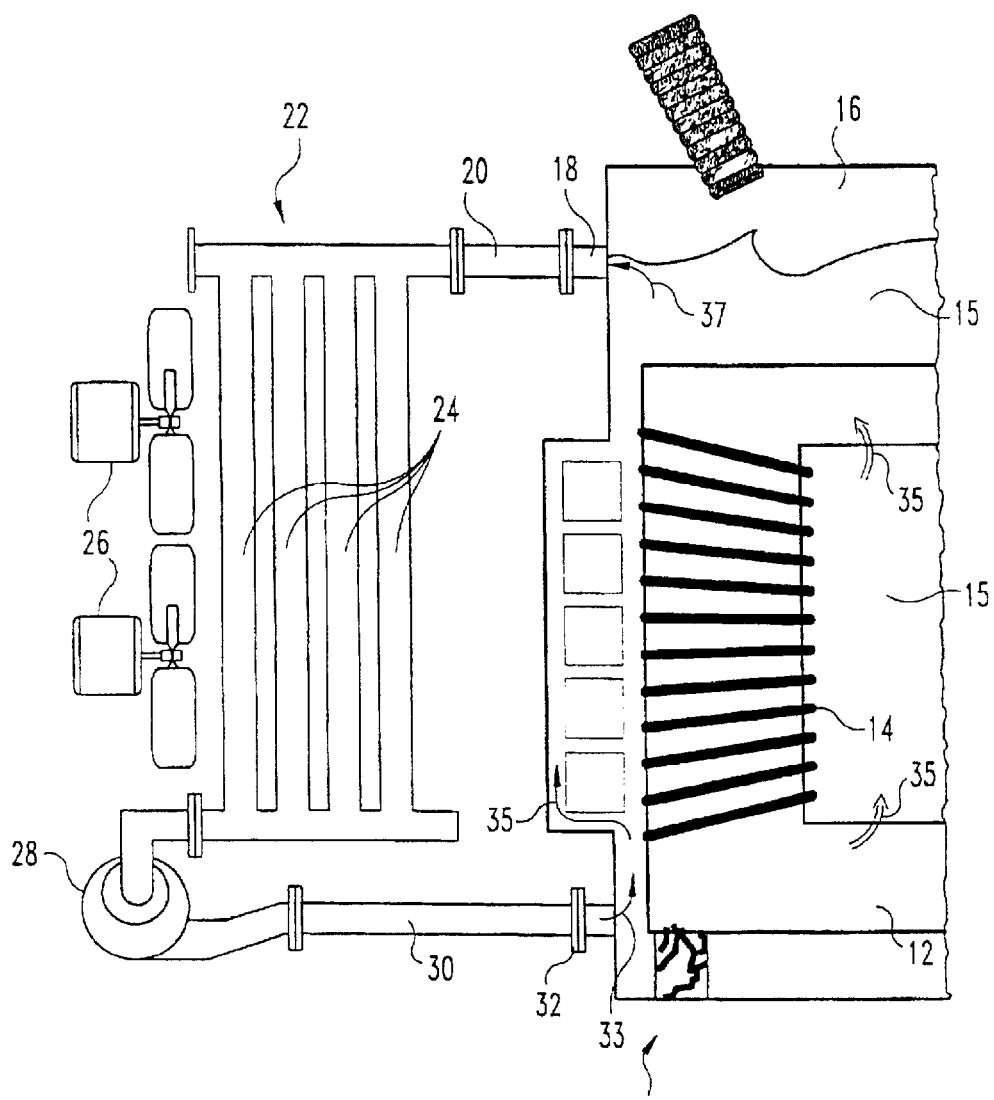
FIG. 1 is a diagrammatic front view, in partial cross-section, of a prior art cooling system for a power transformer.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates. For example, while the illustrated embodiment is a retrofit to an existing system, the inventive cooling system can be incorporated into the design specifications for a newly constructed power transformer array.

Figure 2:
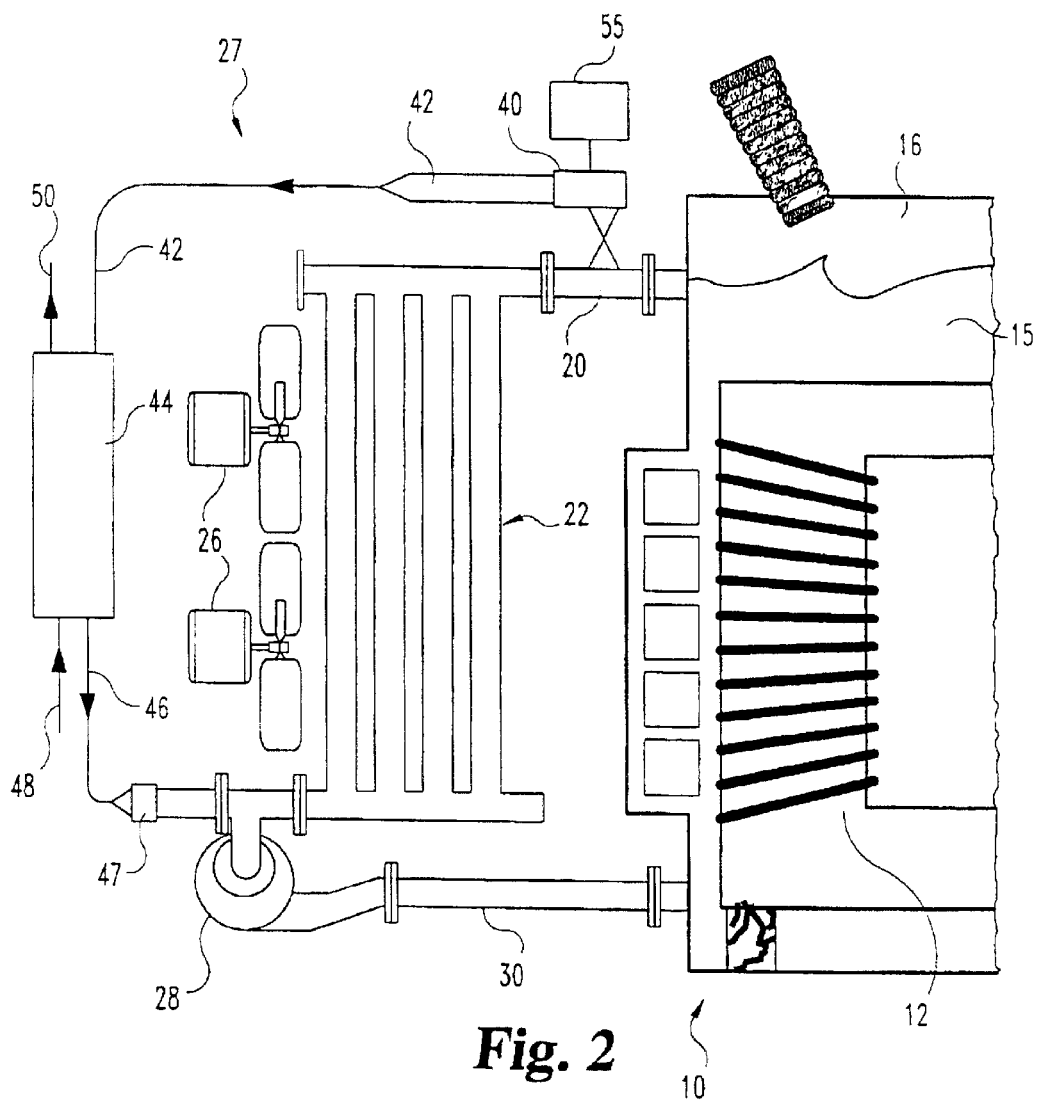
FIG. 2 is a diagrammatic front view, in partial cross-section, of portions of a cooling system for a power transformer of the present invention.

Referring now to FIG. 2, there is diagrammatically shown selected portions of one embodiment of a transformer cooling system 27 of the present invention. In this embodiment, the transformer and cooling system of the prior art shown in FIG. 1 has been retrofit with a cooling system of the present invention to provide improved transformer cooling capabilities during many operating conditions possibly experienced by the transformer. Thus, the inventive cooling system is being used to augment the cooling capabilities of a conventional cooling system. This embodiment is illustrative and not intended to be limiting as the inventive cooling system alternatively may be used as the sole cooling system for the cooling oil of a transformer.

With reference numerals in FIG. 2 the same as in FIG. 1 for corresponding parts, the inventive cooling system introduces a three-way valve, diagrammatically shown at 40, into conduit 20. Valve 40 is plumbed to a conduit 42 that connects to a supplemental heat exchanger, abstractly shown at 44, which is used to cool the cooling oil flowing around the transformer. Although shown for purposes of illustration in FIG. 2 as being above or proximate conduit 20, three-way valve 40 is positioned in conduit 20 in order to selectively redirect cooling oil such that the oil bypasses the radiator 22 and instead flows into conduit 42 and then through the chilled working fluid heat exchanger 44. This bypassing is programmed (using controller 55 described herein) to occur when fans 26 and radiator 22 are not going to be capable of properly cooling the cooling oil.

In one feature of the invention, a return line 46 from heat exchanger 44 is connected to circulating pump 28. Return line 46 introduces oil cooled during its passage through heat exchanger 44 to pump 28 for recirculation through transformer 10. The temperature to which the oil is cooled depends on the transformer's loading, ambient temperature conditions, and the cooling system, which temperatures are preferably low enough not to degrade the life or efficiency of the transformer. Preferably, a check valve or a two-way valve 47 is interposed in return line 46 to control the recirculation flow provided to the transformer. In one embodiment, this valve 47 can be controlled in conjunction with valve 40.

Heat exchanger 44 utilizes a chilled working fluid or chillate to sensibly reduce the temperature of the cooling oil from the transformer routed through the heat exchanger 44. The chillate is introduced into heat exchanger 44 through conduit 48 connected to a conventional source of chillate (not shown). The chillate that has been heated when being used to reduce the temperature of the cooling oil is discharged from heat exchanger 44 through conduit 50, which returns the chillate to the chillate source for reuse. Heat exchanger 44 can be any one of a variety of differently configured heat exchangers known in the art, such as a shell and tube heat exchanger. However, in the most preferred embodiment of the invention, the heat exchanger relies upon a fluid-to-fluid transfer of heat energy between flows of working fluids (i.e, cooling oil and chillate).

Three-way valve 40 is connected to a temperature sensing and control mechanism or controller, shown abstractly at 55, that controls the operation of valve 40. Controller 55 can also be programmed and operatively connected in a conventional fashion so as to control the remainder of the inventive cooling system, such as the two-way valve 47 or the flow of chillate from the chillate source, in a manner that will be understood by one of skill in the art in view of the explanation below. Preferably, the controller 55 can be a conventional programmable controller that generates control signals as a function of various input signals. In one specific embodiment, the controller 55 can be programmed to control valve 40 as a function of the temperature of the cooling oil. In this specific embodiment, controller 56 can include temperature sensors installed internally and/or externally to the transformer housing or tank, such as suspended in the cooling oil in the top third of the housing in particular.

In order to optimize transformer performance, controller 55 can be configured so that as the sensed temperature of the transformer insulating and cooling oil begins to rise, digital signals from the sensors can be provided to a solid state integrated thin film device which extrapolates the rise curve to determine if the maximum cooling oil temperature will exceed an acceptable level during a predetermined ensuing time period. Of course, this same determination can be made at a software level with an appropriately configured controller 55. Typically, maximum temperatures within the transformer must be maintained below 95° C. (203° F.) or limited to a 65° C. rise above ambient temperatures in order to maintain rated capability of the transformer and preserve useful life. If these parameters are anticipated to be exceeded, then controller 55 automatically opens valve 40, as well as other necessary valves, in proper sequence to start the chilling process. For example, when the chillate source has produced chillate at a proper temperature, valves are opened in sequence to allow the chillate to flow through the "cooling" heat exchanger 44. The controller 55 can substantially simultaneously open valve 40 to route the high temperature cooling oil for temperature reduction.

Due to this "look ahead" feature of the system control architecture, the internal components of transformer 10 are never allowed to approach temperatures which could reduce the useful life or efficiency of the transformer. Furthermore, the controller 56 can be programmed to operate the inventive cooling system within any range of ambient and cooling oil temperatures to maximize power transfer of the transformer. In an alternative approach, the controller 55 can include stored information indicative of a temperature history of a specific transformer. For instance, transformers typically exhibit a generally uniform temperature response to operating loads and ambient conditions. Each transformer responds differently and each has a different threshold temperature response before a deleterious condition arises. The controller 55 can maintain a temperature history or profile for every transformer connected to the cooling system. Actual temperature data from the cooling oil temperature sensors for each transformer can be compared against this profile to determine if a problematic temperature condition is anticipated.

It is within the scope of the present invention for chillate to be supplied to heat exchanger 44 in any fashion which is known to the skilled artisan. For example, transformer station electricity can be used to produce chillate by powering vapor compression refrigeration equipment, or an absorption chiller and/or natural sources of groundwater, lakes, etc. (e.g., operating a pump that brings groundwater to the heat exchanger). Such vapor compression refrigeration equipment may be operated on-line, in other words during the time period such chillate is actually needed, or off-line, or both on-line and off-line. When operated off-line, chillate produced by the vapor compression refrigeration equipment can be stored adequately as a fluid or ice which can later be used for removing core heat. Still further, the power transformer itself is a robust source of heat that can be used to power an absorption refrigeration or chiller as described more fully below. When the transformer heat is the source of energy for its own cooling, a cooling system even more energy efficient than achieved by the use of fans or vapor compression refrigeration may be realized.

Figure 3:
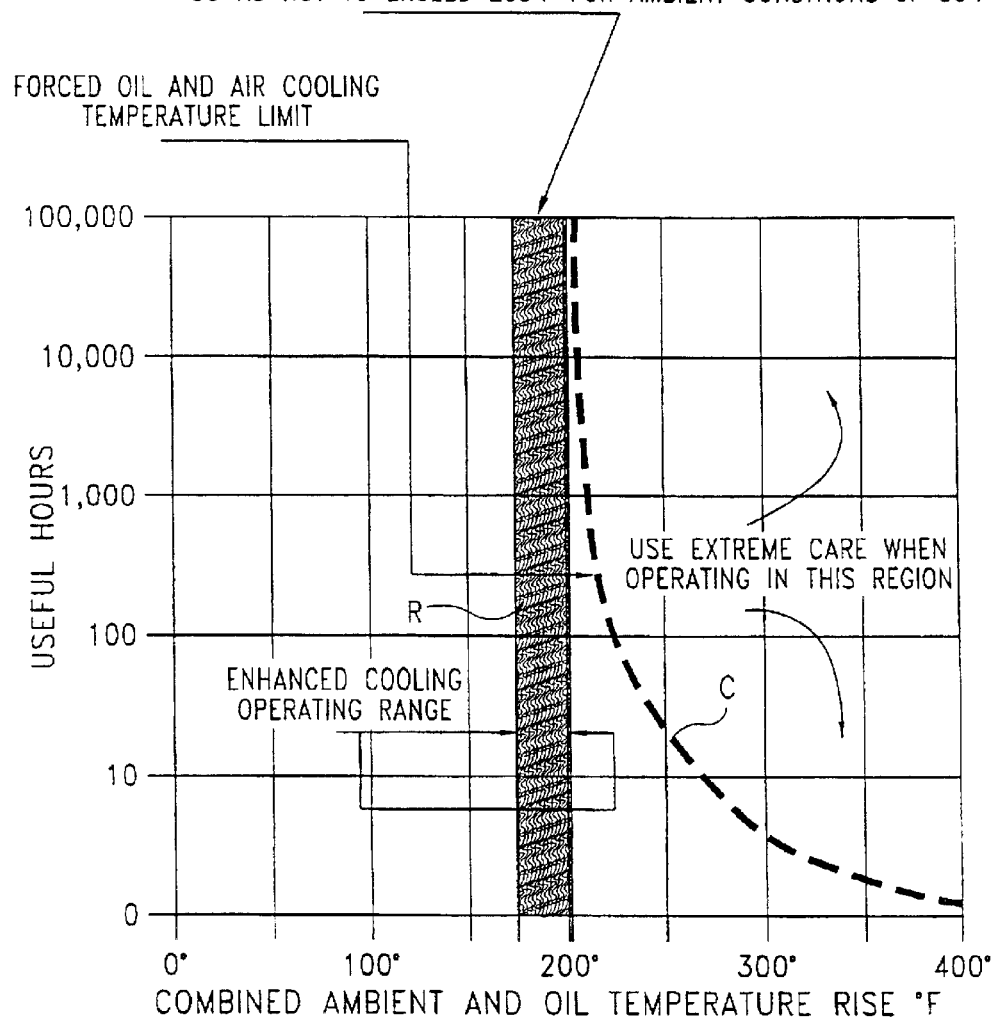
FIG. 3 is a diagram of transformer useful hours as a function of transformer oil temperature, comparing the performance of prior art cooling systems with the performance of a cooling system constructed according to the teachings of the present invention.

The graph in FIG. 3 helps illustrate the benefits obtained by the cooling system depicted in FIG. 2. The graph relates transformer life, in useful hours, to the temperature rise in the transformer cooling oil. The curve C depicts the limits of performance for the traditional forced oil and air cooling systems of the prior art. These prior systems are typically unable to predictably maintain the transformer performance to the left of the curve C, which means that the transformer may operate in a dangerous range. However, with the present invention, the transformer performance is always maintained in the "safe" region, as represented by the operating range R in FIG. 3.

Figure 4:
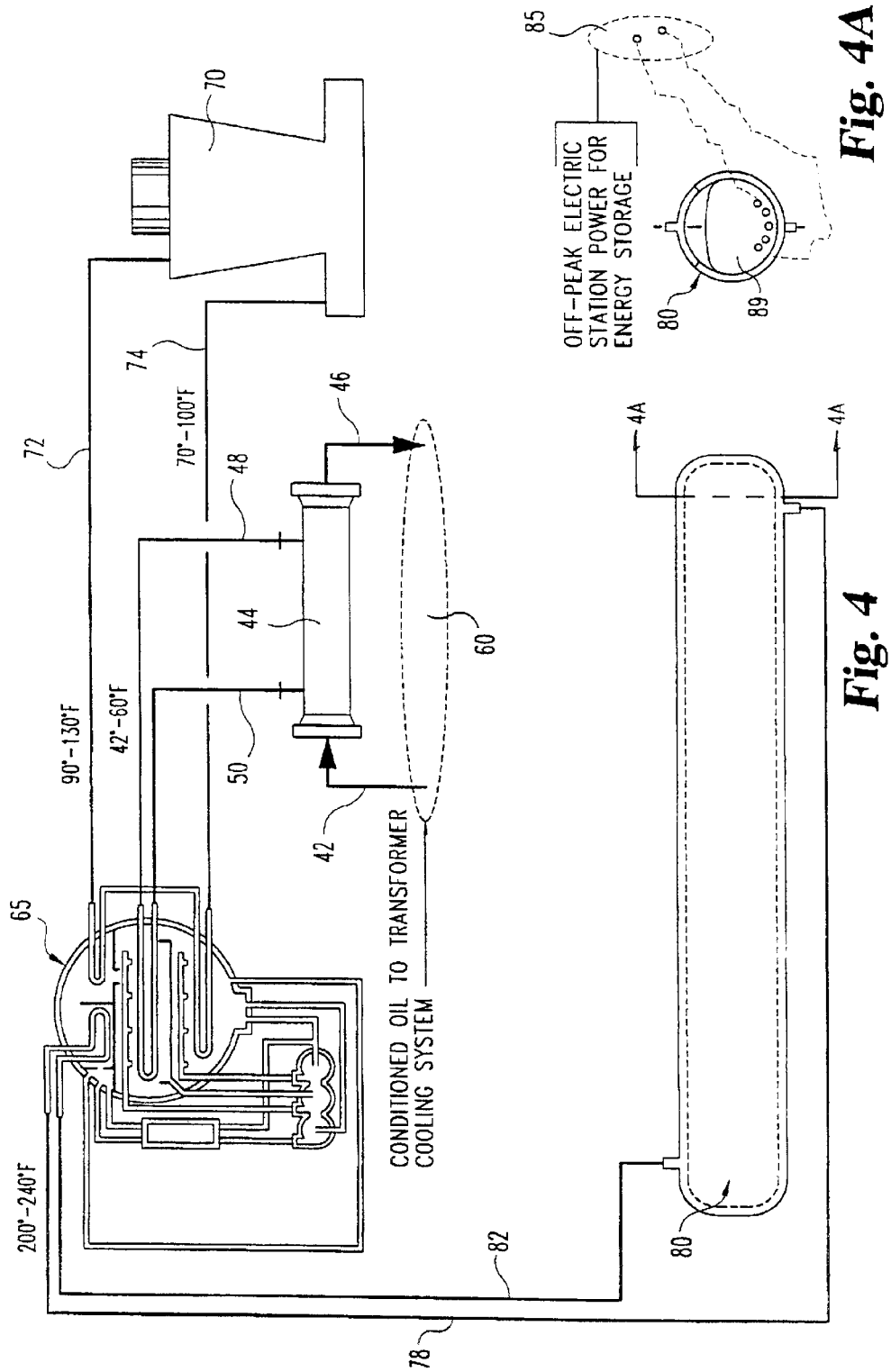
FIG. 4 is diagrammatic view illustrating one embodiment of the components used to produce chillate for the heat exchanger of FIG. 2.

Referring now to FIG. 4 and FIG. 4A, one configuration of equipment suitable for providing chillate to the supplemental heat exchanger 44 of FIG. 2 is shown. In FIG. 4, the transformer 20 and the related components shown in FIG. 2, and other than heat exchanger 44, are indicated abstractly at 60. In this embodiment, an absorption chiller or refrigeration generator, generally designated 65, is used as the source of chillate for heat exchanger 44.

Conduit 48 is operably connected to absorption chiller 65 to deliver a cooled working fluid or chillate from the absorption chiller 65 to the shell and tube heat exchanger 44. The chillate can be water preferably at a temperature between about 42° F. and 60° F. The chiller 65 is controlled by the controller 55 to provide a modulated temperature fluid. Conduit 50 is operably connected to absorption chiller 65 to return the warmed chillate for recooling. Absorption chiller 65 is connected, via pipes 72 and 74, to a cooling tower 70 of traditional design which allows the excess absorbed heat from the absorption chilling process to be rejected to the atmosphere. Pipe 72 conveys high temperature water, such as at temperatures of between about 90° F. and 130° F., to cooling tower 70 for cooling. Pipe 74 returns lower temperature water, such as at temperatures of between about 700° F. and 100° F., to absorption chiller 65 for cooling uses.

The heat energy used to power absorption chiller 65 is supplied by high temperature water, such as at temperatures of between about 200° F. and 240° F., delivered by pipe 78 from a phase change material (PCM) heat exchanger 80. Steam may also be the source of heat energy. Pipe 82 returns lower temperature water from absorption chiller 65 to PCM heat exchanger 80 for reheating. IN a most preferred embodiment, PCM heat exchanger 80 can be of a type described in co-pending U.S. patent application Ser. No. 09/607,853, entitled "Phase Change Material Heat Exchanger With Heat Energy Transfer Elements Extending Through the Phase Material," the teachings of which are incorporated herein by reference in their entirety.

As abstractly shown in FIG. 4A, the output of the transformer station 85 is electrically connected to the heat energy transfer elements 87 embedded in the phase change material 89. Electricity from the transformer station 85 is dispatched to heat the elements 87 and melt the phase change material 89. This process is preferably initiated by a controller, such as controller 55, at a time of day when the dispatch load is less than the transformer rating, including possibly off-line times such as at night when the inventive cooling system is either less needed. PCM heat exchanger 80 is designed such that the heat energy given up as the phase change material solidifies from a molten state is transferred to the water passed through the annulus of the heat exchanger and routed to the absorption chiller 65, such that chiller 65 can produced chillate used to condition the transformer oil passing through heat exchanger 44.

Further description of the internal operations of the absorption chiller 65 is not provided herein, as the general operation is known in the art. For example, the configuration and workings of a chiller 65 are further described in U.S. Pat. No. 4,936,109, the teachings of which are incorporated herein by reference in their entirety.

Figure 5:
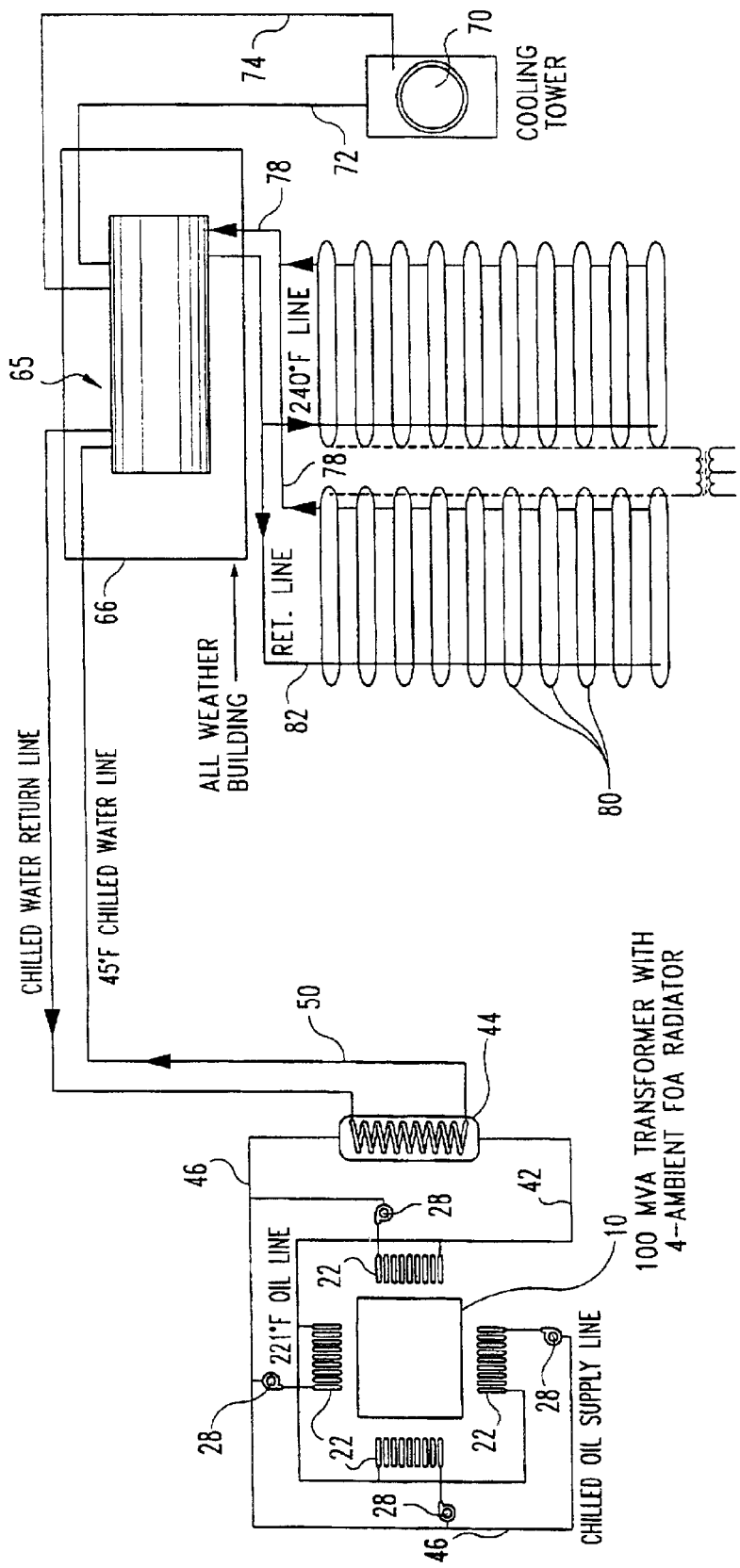
FIG. 5 is a diagrammatic plan view of a power transformer cooling system of the present invention suitable for use with a 100 MVA power transformer.

Referring now to the diagrammatic top view of FIG. 5, the cooling system of FIG. 4 is more further shown retrofit or adapted to cool an existing power transformer 10 with a 100 MVA capacity rating, for example. The existing transformer 10 is shown already equipped with four forced oil air ambient cooling radiators 22 and their associated pumps 28 connected in a conventional fashion, and as described above with reference to FIG. 2, to the internal volume of the transformer. As described above with reference to FIG. 2, each inlet to the radiator 22 is provided with a bypass valve, such as valve 40, connected to a common high temperature oil line 42 plumbed to a heat exchanger, such as heat exchanger 44. The transformer oil cooled by passage through heat exchanger 44 is returned by the multi-branched pipe 46 for reintroduction into the transformer at the four inlets proximate the four radiators 22. In one specific embodiment, the heat exchanger is provided with a heat transfer capacity of about seventy-five therms, and although shown as a single unit, may be comprised of multiple smaller units that together provide the required cooling capacity.

The temperature of the cooling oil outlet from the heat exchanger is a function of the ambient conditions and the transformer loading. When ambient temperatures are high, the heat exchanger works to outlet a cooling oil at a temperature that, in conjunction with the throughput of the cooling oil as controlled by the controller 55, keeps the transformer from heating up beyond its recommended level. For example, for the embodiment of FIG. 5 more fully described herein, under peak weather conditions in the summer in the Midwest (ambient air of about 100° F.) during which electricity usage is at its peak so that the transformer 10 is fully loaded, the cooling oil needs to keep the transformer from overheating. In a specific instance, and by way of example only, the temperature of the oil inlet to heat exchanger 44 can be about 221° F. with the temperature of the cooling oil outlet from the heat exchanger 44 at a lower set point, such as about 176° F. If an even a lower temperature of the outlet cooling oil is desired for such conditions, a larger chiller, as well as more heat exchangers than shown in FIG. 5 for more energy storage, may be required. Of course, other types of heat sinks can be substituted for the described heat exchangers to accomplish the requisite energy storage capacity. Still further, in situations where ambient temperatures are lower, the output of the heat exchangers can be at a lower temperature and can be used to cool the transformer even further (i.e., below 221° F.) to improve transformer efficiency.

In the specific embodiment depicted in FIG. 5, a 415 ton absorption chiller 65 housed in an all weather building abstractly shown at 66 provides heat exchanger 44 with a flow of a chillate, such as chilled water at about 45° F., through conduit 48. Conduit 50 returns the warmed chillate from heat exchanger 44 to chiller 65. Absorption chiller 65 is connected to a cooling tower 70 via pipes 72 and 74 in a conventional fashion.

Again by way of example, the absorption chiller 65 can be powered by high temperature water at about 240° F. delivered by pipe 78 connected in parallel to a plurality of PCM heat exchangers 80 of the type described with reference to FIG. 4. The heat exchangers 80 can comprise twenty units, each constructed from a forty-two foot long, twenty-four inch diameter tube. Each heat exchanger can be filled with about eight tons of phase change material or salt. Pipe 82 is connected in parallel to the heat exchangers 80 to return lower temperature water from absorption chiller 65 for reheating. Heat exchangers 80 can be selectively supplied with off-peak station electric in order to store several million BTUs (such as 15,000,000 BTUs which can be enough for two hours of operations during maximum transformer loading and temperature) within electrically melted phase change material for eventual heating of water for use by chiller 65 or other cooling apparatus. As the stored energy in exchangers 80 is used up over time, the controller which regulates the operation of the cooling system causes additional electrical energy to be pulled from the station electric when the station is not involved with on-peak dispatch to replenish the energy storage of the phase change material. In other words, the electrical power to melt the phase change materials is obtained from the transformer substation during times of lower electrical requirements such as night time and hours during the day when the full electric capacity of the station is not required to serve demand. While these principles of the invention have been explained with reference to a PCM-type heat exchanger, other forms of heat exchanger can be adapted for use with this inventive system.

Figure 6:
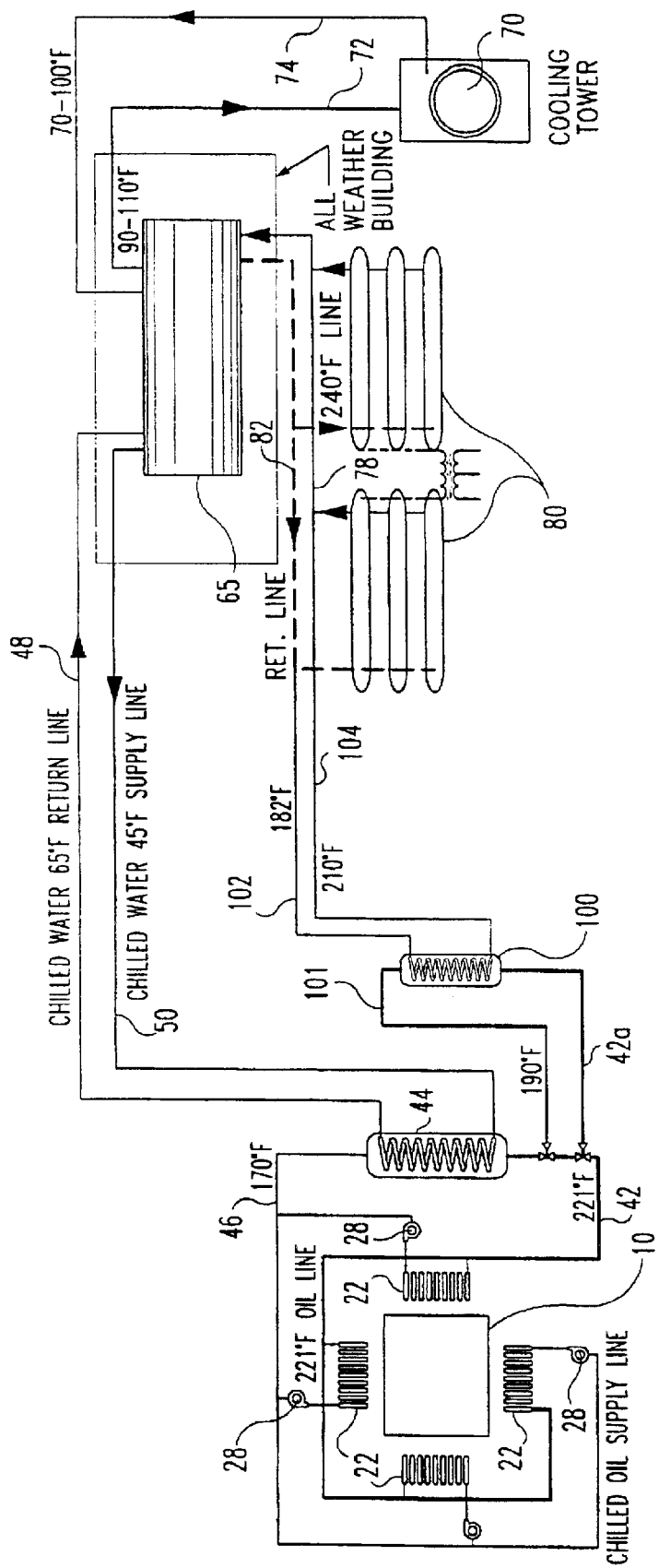
FIG. 6 is a diagrammatic plan view of another power transformer cooling system of the present invention.

Referring now to FIG. 6, there is shown still another embodiment of the transformer cooling system of the present invention. The cooling system of FIG. 6 is similar to the cooling system of FIG. 5 except that it further includes a secondary heat exchanger 100 that is employed to allow the absorption chiller to be powered by the heat generated by the transformer. In some instances, during start up of the absorption chiller additional cooling capacity may be required. Moreover, additional heat energy may be needed by the chiller itself to facilitate its start up.

In this embodiment, high temperature cooling oil from the transformer is introduced into heat exchanger 100, which may be a shell and tube heat exchanger, via branch 42a connected to conduit 42. Preferably, a controllable valve is interposed between the conduit 42 and branch 42a, which valve may be controlled by a separate programmable controller as a function of the cooling oil temperature, the status of the absorption chiller 65 or other conditions. Reduced temperature cooling oil is discharged from heat exchanger 100 into branch 101 connected to the inlet of the primary heat exchanger 44. In a specific embodiment, the secondary heat exchanger can reduce the oil temperature from 221° F. to about 190° F.

The working fluid, such as water, to be heated by heat exchanger 100 is delivered by pipe 102 that is connected to pipe 82, which returns lower temperature water from absorption chiller 65 for reheating. The heated working fluid outlet from heat exchanger 100 enters pipe 104 that is connected to pipe 78 that delivers high temperature water, such as between about 200° F. and 240° F., to absorption chiller 65 to power the production of chillate routed to heat exchanger 44. Appropriate valving can be connected to the controller of the inventive cooling system through pipes 78 and 82 such that fluids may be selectively routed between absorption chiller 65 and either the PCM heat exchangers 80 or heat exchanger 100. Such valves cause heat energy to be supplied to absorption chiller 65 from the larger heat energy source of PCM heat exchangers 80 during certain periods, such as during start up of the chiller in an effective manner or when the chillate required by heat exchanger 44 is greater than can be provided by absorption chiller 65 when only powered by the heat from heat exchanger 100. More particularly, the PCM heat exchangers 80 can provide a surge of heat to enable efficient starting of the chiller when the transformer itself has not "banked" enough heat releasable by heat exchanger 100 to do so, or when "banking" sufficient heat in the transformer would be adverse to the life or efficiency of the transformer. In an alternate embodiment, instead of using PCM heat exchangers 80, the start up of the chiller can be provided by other known devices such as a mechanical refrigeration device, for example an auxiliary boiler. Heat energy is supplied to chiller 65 by heat exchanger 100 when the absorption chiller has been started and is operating in a continuous mode, or at times that lesser chillate production is required.

The preferred embodiment of FIG. 6 that uses PCM heat exchangers with the adjunct of a system employing the transformer heat (heat exchanger 100) allows the system operator to optimize the economics of the transformer cooling invention by selecting those times when electric energy is most available and least costly to charge the PCM system so that it would be available to enhance transformer operation when the equipment and system are in a high stress maximum cost of operation mode. A concurrent benefit of the system as it is configured also allows system operators to elect to "bank" heat stored in the PCM heat exchangers during times when energy costs are the lowest, off-peak times, and bring them back by operating the transformer cooling system to reduce transformer winding and core losses which improves the units throughput efficiency and reduces operating costs, even when the unit is able to operate below critical temperatures because of lower ambient temperatures.

In one specific embodiment useful for a 300 MVA transformer, the chiller can be a 354 ton device, such as the Trane Model ABSC-03F. The heat exchanger can be a 16–18 ton PCM unit. The illustrated system can store 3,300,000 BTUs off-peak to augment the heat source for the absorption chiller.

In a modification to the embodiment of FIG. 6, the outlet line 101 can be connected directly to conduit 46, thereby effectively bypassing the primary heat exchanger 44. With this configuration, the secondary heat exchanger 100 can provide the primary cooling for the transformer oil, thereby reducing the output requirements for the absorption chiller.

Figure 7:
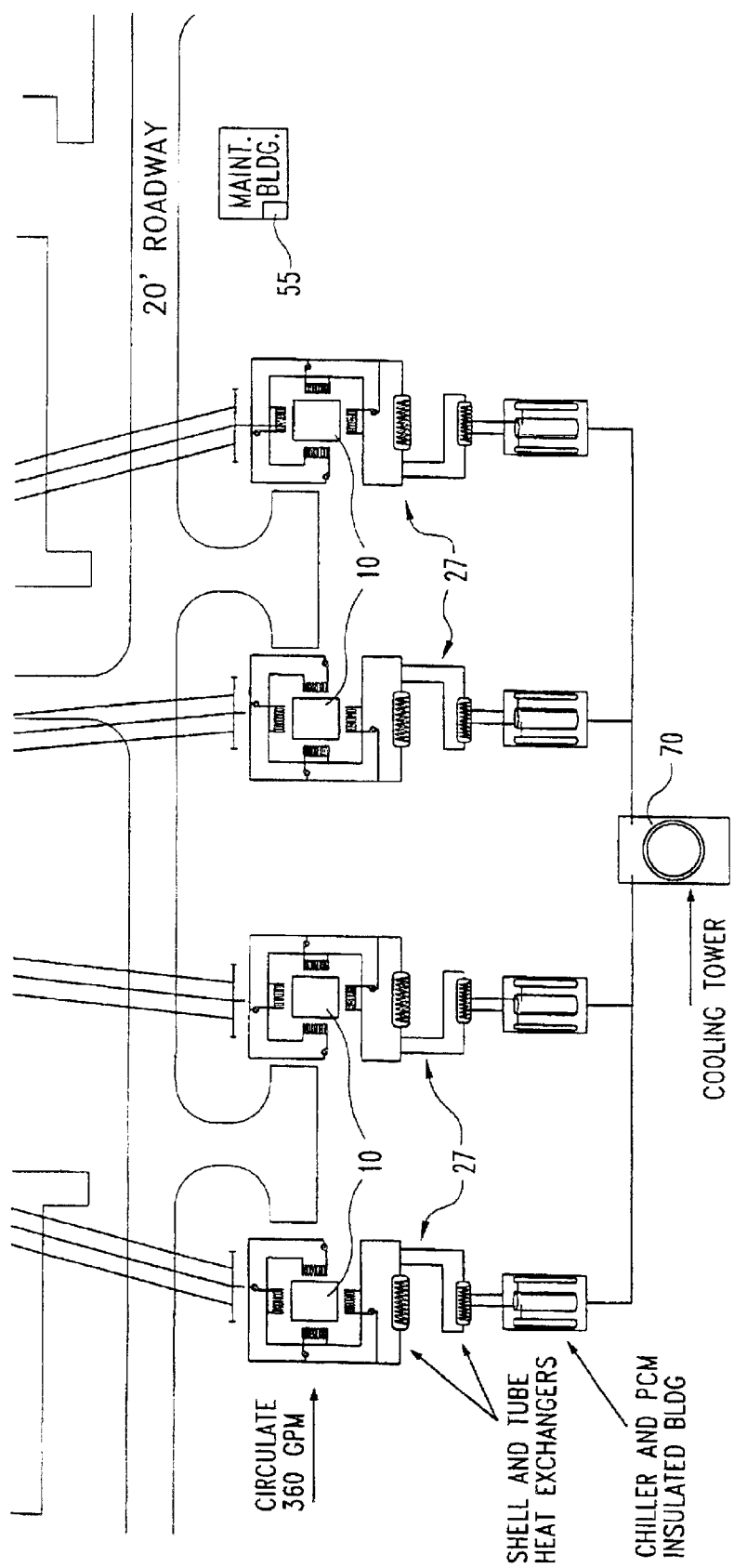
FIG. 7 is a diagrammatic representation of a power substation having a number of transformers, each including a cooling system in accordance with one embodiment of the present invention.

The cooling system of the present invention, such as system 27 described above, can form an integral part of a power generation substation. Thus, as depicted in FIG. 7, a number of transformers 10 can be provided with a corresponding cooling system 27. Each cooling system can include a chiller, such as chiller 65, connected to a common cooling tower 70. The programmable controller 55 can be housed in a maintenance or control building. A single controller can be provided for each cooling system, or a common controller can receive temperature and performance data from and issue control signals to every cooling system. Preferably, the components of each cooling system 27 are calibrated to circulate cooling oil at about 360 gpm, and to accomplish on-line chilling up to 118 tons/hr.

While this invention has been shown and described as having preferred designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for reducing the temperature of a coolant flowing through a power transformer cooling system provided for cooling the transformer, said system comprising:

a first forced air heat exchanger connected to the transformer cooling system;

a second liquid-to-liquid heat exchanger connected to the transformer cooling system; and a source of chillate connected to said second heat exchanger to provide chillate thereto for withdrawing heat from the coolant flowing through said second heat exchanger.

2. The system for reducing the temperature of a coolant flowing through a transformer cooling system according to claim 1, wherein said first and second heat exchangers are connected in parallel to the transformer cooling system.

3. The system for reducing the temperature of a coolant flowing through a transformer cooling system according to claim 2, wherein:

said first heat exchanger has a first inlet and a first outlet, each connected to the transformer cooling system by a corresponding inlet conduit and an outlet conduit; and said second heat exchanger has a second inlet and a second outlet, said second inlet connected to said inlet conduit between the transformer cooling system and said first inlet.

4. The system for reducing the temperature of a coolant flowing through a transformer cooling system according to claim 3, further comprising:

a controllable valve disposed between said second inlet and said inlet conduit, said valve selectively operable in an open position to permit fluid flow from said inlet conduit to said second inlet and in a closed position to prevent fluid flow from said inlet conduit and said second inlet.

5. The system for reducing the temperature of a coolant flowing through a transformer cooling system according to claim 4, wherein said controllable valve is controlled to said open position or said closed position as a function of the temperature of either the transformer cooling system or the transformer.

6. The system for reducing the temperature of a coolant flowing through a transformer cooling system according to claim 5, wherein said controllable valve includes a programmable controller having a memory for storing a temperature profile of either the transformer cooling system or the transformer and means for comparing the temperature of either the transformer cooling system or the transformer to said temperature profile.

7. The system for reducing the temperature of a coolant flowing through a transformer cooling system according to claim 1, wherein said source of chillate includes an absorption chiller.

8. The system for reducing the temperature of a coolant flowing through a transformer cooling system according to claim 7, wherein said absorption chiller is connected to a liquid heat storage component.

9. The system for reducing the temperature of a coolant flowing through a transformer cooling system according to claim 8, wherein said heat storage component includes a phase change material.

10. The system for reducing the temperature of a coolant flowing through a transformer cooling system according to claim 8, wherein said heat storage component is powered by energy generated by the transformer.

11. The system for reducing the temperature of a coolant flowing through a transformer cooling system according to claim 10, wherein said heat storage component is powered by heat energy generated by the transformer.

12. A system for reducing the temperature of a coolant flowing through a power transformer cooling system provided for cooling the transformer, said system comprising:
   a liquid-to-liquid heat exchanger connected to the transformer cooling system, said heat exchanger having a coolant inlet for receiving coolant at an elevated temperature from the cooling system, a coolant outlet for discharging coolant to the cooling system at a relatively lower temperature, a chillate inlet for receiving a liquid chillate and a chillate outlet for discharging the chillate from said heat exchanger after absorbing heat energy from the coolant; and
   a source of liquid chillate connected to said heat exchanger to provide chillate thereto at a reduced temperature less than said relatively lower temperature.

13. The system for reducing the temperature of a coolant flowing through a power transformer cooling system according to claim 12, wherein said chillate is water.

14. The system for reducing the temperature of a coolant flowing through a power transformer cooling system according to claim 12, wherein said source of liquid chillate includes an absorption chiller.

15. The system for reducing the temperature of a coolant flowing through a transformer cooling system according to claim 14, wherein said absorption chiller is connected to a liquid heat storage component.

16. The system for reducing the temperature of a coolant flowing through a transformer cooling system according to claim 15, wherein said heat storage component includes a phase change material.

17. The system for reducing the temperature of a coolant flowing through a transformer cooling system according to claim 14, wherein said heat storage component is powered by energy generated by the transformer.

18. The system for reducing the temperature of a coolant flowing through a transformer cooling system according to claim 17, wherein said heat storage component is powered by heat energy generated by the transformer.

19. The system for reducing the temperature of a coolant flowing through a transformer cooling system according to claim 12, further comprising a second liquid-to-liquid heat exchanger connected between the cooling system and said coolant inlet.

20. The system for reducing the temperature of a coolant flowing through a transformer cooling system according to claim 19, wherein:
   said source of liquid chillate includes;
   an absorption chiller; and
   a liquid heat storage component connected to said absorption chiller having an inlet receiving chillate from said absorption chiller at a first temperature and an outlet discharging chillate to said absorption chiller at a higher second temperature; and
   said second heat exchanger is connected to said absorption chiller to receive chillate at said first temperature and to discharge chillate to said chiller at a third temperature greater than said first temperature.

21. A method for reducing the temperature of a coolant flowing through a transformer cooling system comprising the steps of:
   passing the coolant through a liquid-to-liquid heat exchanger to reduce the temperature of the coolant;
   passing a chillate through the heat exchanger to extract heat energy from the coolant; and
   cooling the chillate using an absorption chiller driven by a heat energy storage component.

22. The method according to claim 21, further comprising the step of driving the heat energy storage component by energy extracted from the transformer.

23. The method according to claim 22, wherein the energy extracted from the transformer is heat energy.

24. The method according to claim 23, wherein the heat energy extracted from the transformer is waste heat.

25. The method according to claim 22, wherein:
   the heat energy storage component includes a phase change material; and
   the energy extracted from the transformer is electrical energy.

26. The method according to claim 22 in which the transformer is part of a power distribution grid and the energy extracted from the transformer is off-peak electrical energy.

* * * * *